(12) United States Patent
Hyatt et al.

(10) Patent No.: US 7,574,187 B2
(45) Date of Patent: Aug. 11, 2009

(54) BATTERY CHARGER ANTENNA, METHOD AND DEVICE INCORPORATING THE SAME

(75) Inventors: Edward Craig Hyatt, Durham, NC (US); Markus Jan Friberg, Malmö (SE); Henrik Carl Floberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 434 days.

(21) Appl. No.: 11/420,834

(22) Filed: May 30, 2006

(65) Prior Publication Data

US 2007/0281756 A1    Dec. 6, 2007

(51) Int. Cl.
*H04B 1/06* (2006.01)
(52) U.S. Cl. ............. 455/270; 455/569.1; 455/344
(58) Field of Classification Search .............. 455/569.2, 455/573, 575.7, 269, 270, 344, 345, 556.1, 455/557
See application file for complete search history.

(56) References Cited

U.S. PATENT DOCUMENTS

| | | | | |
|---|---|---|---|---|
| 4,684,870 | A | * | 8/1987 | George et al. .............. 320/140 |
| 5,479,479 | A | * | 12/1995 | Braitberg et al. .......... 455/404.1 |
| 6,075,999 | A | * | 6/2000 | Vilmi et al. .............. 455/569.2 |
| 6,255,800 | B1 | | 7/2001 | Bork |
| 2005/0054386 | A1 | * | 3/2005 | Chung ...................... 455/569.1 |
| 2005/0186994 | A1 | * | 8/2005 | Rahmel et al. ............ 455/572 |
| 2008/0057888 | A1 | * | 3/2008 | Shoykhet et al. .......... 455/161.1 |
| 2008/0233911 | A1 | * | 9/2008 | Baker et al. ................ 455/205 |

FOREIGN PATENT DOCUMENTS

| | | |
|---|---|---|
| DE | 196 36 732 | 4/1998 |
| EP | 0 622 907 | 4/1994 |
| EP | 0 701 303 | 3/1996 |
| EP | 0 750 541 | 3/1997 |
| GB | 2 281 677 | 3/1995 |
| JP | 58-25731 | 2/1983 |
| JP | 58025731 | * 2/1983 |
| WO | 02/38100 | 5/2002 |

OTHER PUBLICATIONS

International Search Report for corresponding Application No. PCT/US2006/045437 mailed Apr. 17, 2007.
PCT International Preliminary Report on Patentability in corresponding International Application No. PCT/US2006/045437 mailed Dec. 19, 2008.

* cited by examiner

*Primary Examiner*—Blane J Jackson
(74) *Attorney, Agent, or Firm*—Renner, Otto, Boisselle & Sklar, LLP

(57) ABSTRACT

A method for providing battery charge current to a portable electronic device having a rechargeable battery. The method includes the steps of providing a power adaptor which connects to a power supply and converts power from the power supply into a battery charge current; providing a cable operative to deliver the battery charge current from the power adaptor to the portable electronic device to charge the rechargeable battery; and providing radio frequency (RF) signals induced onto the cable to an RF receiver input.

22 Claims, 4 Drawing Sheets

BATTERY CHARGER ANTENNA, METHOD AND DEVICE INCORPORATING THE SAME

TECHNICAL FIELD OF THE INVENTION

The present invention relates generally to portable electronic devices, and more particularly to rechargeable portable electronic devices.

DESCRIPTION OF THE RELATED ART

Portable electronic devices have been popular for decades, and continue to increase in popularity. Many modern portable electronic devices are intended or suitable for recording or playback of acoustic and/or video signals. For example, portable CD or DVD players, MPEG players, MP-3 players, etc. provide a vast variety of forms of personal entertainment. Whether audio and/or video entertainment, there are numerous portable electronic devices to satisfy any user's tastes.

Similarly, portable electronic devices in the form of mobile phones, pagers, communicators, e.g., electronic organizers, personal digital assistants (PDAs), smartphones or the like are also becoming increasingly popular. Such devices allow a user to communicate with others, store and manipulate data, create text, etc., many times within the same device.

Although portable radios per se have been available for many years, nowadays more and more other types of portable electronic devices, e.g., mobile phones, pagers, PDAs, etc., have been designed also to include a radio function. For example, FIG. 1 illustrates a conventional mobile phone 10 for use in mobile communication systems such as cellular networks, satellite networks, etc. The mobile phone 10 includes a built-in AM/FM radio receiver (not shown) that enables the mobile phone 10 to receive AM/FM radio broadcasts.

The user may listen to the radio broadcasts via a headset 12 having a pair of earbuds 14 or the like. The earbuds 14 are connected to the mobile phone 10 via a wire or cable 16 and headset connector 18. The radio receiver within the mobile phone 10 receives and demodulates AM/FM broadcast signals. The mobile phone 10 outputs the resultant audio signals (mono or multi-channel) to the headset 12 so that the user may listen to the radio broadcasts using the earbuds 14.

In the case of the mobile phone 10, the built-in antenna used in carrying out mobile communications is designed for frequencies much higher than AM/FM or other lower frequency radio signals. Consequently, the built-in antenna is not suitable for receiving AM/FM broadcast signals. In the case of other types of portable electronic devices, e.g., PDAs, CD players, etc., the portable electronic device may not include any type of built-in antenna whatsoever. Accordingly, such devices frequently use the cable 16 of the headset 12 as an antenna. The mobile phone 10 or other type of electronic device includes sense circuitry therein that detects that a headset 12 has been connected to the device. The mobile phone 10 or other device is configured to detect the presence of the headset 12 and thereby enable operation of the radio receiver using the cable 16 as an AM/FM antenna as represented in FIG. 1.

Despite the benefits of using the headset cable as an antenna, there have been various drawbacks associated with such conventional design. For example, a headset for a mobile telephone or other type portable electronic device typically connects to the device via a multifunction connector (not shown) included in the device. The multifunction connector not only allows a headset to be coupled to the device, but also allows other types of accessories to be connected to the device. This is disadvantageous in that while another accessory is connected to the mobile phone or other type device via the multifunction connector, it is impossible to connect the headset to the device. As a result, without the antenna it becomes impossible for a user to listen to radio broadcasts while the other accessory is connected to the device.

For example, FIG. 2 shows a power adaptor 20 for charging a rechargeable battery (not shown) included in the mobile phone 10. The power adaptor 20 includes a connector 22 that is designed to connect to the same multifunction connector included in the mobile phone 10 as the connector 18 of the headset 12. Thus, if the user is utilizing the mobile phone 10 to listen to the radio via the headset 12, the user is unable to connect the mobile phone 10 to the power adaptor 20 in order to simultaneously charge the battery in the mobile phone 10. Conversely, if the user is charging the mobile phone 10 using the power adaptor 20, the user cannot simultaneously listen to radio broadcasts.

In view of the aforementioned shortcomings associated with conventional portable devices using a headset cable as an antenna, there is a strong need in the art for a device and system that will allow a user to listen to radio broadcasts even when the portable device is being recharged.

SUMMARY

According to an aspect of the invention, a method is directed to providing battery charge current to a portable electronic device having a rechargeable battery. The method includes the steps of providing a power adaptor which connects to a power supply and converts power from the power supply into a battery charge current; providing a cable operative to deliver the battery charge current from the power adaptor to the portable electronic device to charge the rechargeable battery; and providing radio frequency (RF) signals induced onto the cable to an RF receiver input.

According to a particular aspect of the invention, the cable connects to the portable electronic device, and the portable electronic device comprises decoupling circuitry operative to decouple the RF signals from the cable and to provide the RF signals to the RF receiver input, the RF receiver input being included in the portable electronic device.

In accordance with another aspect of the invention, the decoupling circuitry comprises a decoupling capacitor.

According to yet another aspect, the decoupling circuitry blocks DC components on the cable from being input to the RF receiver input.

According to still another aspect, an accessory is coupled to the cable and provides the battery charge current to the portable electronic device, the accessory comprising decoupling circuitry operative to decouple the RF signals from the cable and to provide the RF signals to the RF receiver input.

In accordance with another aspect, the RF receiver input is included in the portable electronic device.

According to another aspect, the accessory is a docking station for use when charging the rechargeable battery in the portable electronic device.

According to yet another aspect, the RF receiver input is included in the accessory.

According to still another aspect, the accessory further includes an audio amplifier for amplifying audio signals output from the RF receiver included within the accessory.

In accordance with another aspect, the accessory further includes at least one speaker for reproducing the audio signals.

In accordance with still another aspect, the cable is coupled to at least one inductor for isolating the cable from system ground at frequencies of the RF signals.

According to a different aspect of the invention, a portable electronic device is provided that includes a rechargeable battery; a radio receiver including an RF receiver input; an input for receiving a battery charge current from a cable operative to deliver the battery charge current from a power adaptor to the portable electronic device in order to charge the rechargeable battery; and decoupling circuitry operative to decouple RF signals induced onto the cable and to provide the RF signals to the RF receiver input.

According to another aspect, the decoupling circuitry comprises a decoupling capacitor.

In accordance with another aspect, the decoupling circuitry blocks DC components on the cable from being input to the RF receiver input.

With yet another aspect according to the present invention, a docking station for docking a portable electronic device having a rechargeable battery in order to recharge the rechargeable battery. The docking station includes an input for receiving a battery charge current from a cable operative to deliver the battery charge current from a power adaptor to the portable electronic device via the docking station in order to charge the rechargeable battery; and decoupling circuitry operative to decouple RF signals induced onto the cable and to provide the RF signals to an RF receiver input.

According to another aspect, the RF receiver input is included in the portable electronic device.

According to still another aspect, the docking station includes an audio amplifier for amplifying audio signals output from the RF receiver included within the portable electronic device.

According to but another aspect, the docking station further includes at least one speaker for reproducing the audio signals.

In yet another aspect, the RF receiver input is included in the docking station.

In still another aspect, the docking station further includes an audio amplifier for amplifying audio signals output from the RF receiver included within the docking station.

With yet another aspect, the docking station further includes at least one speaker for reproducing the audio signals.

In another aspect, the cable is coupled to at least one inductor for isolating the cable from system ground at frequencies of the RF signals.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
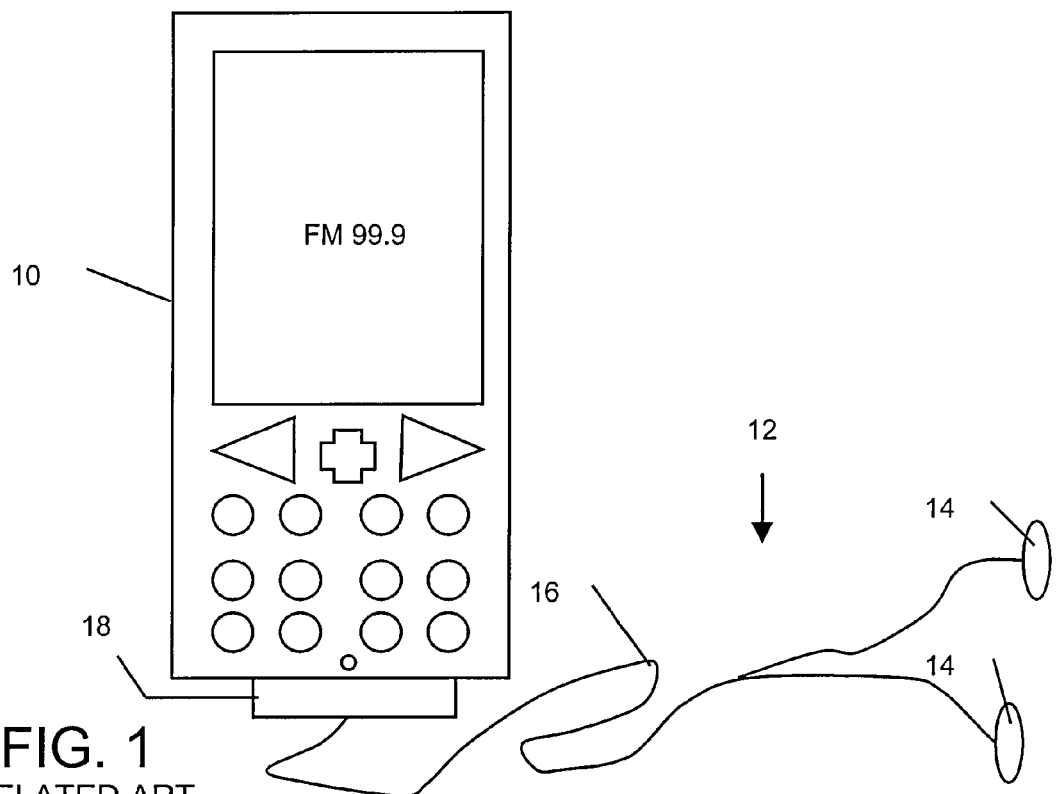
FIG. 1 illustrates a conventional portable electronic device, in the form of a mobile phone, together with a headset.

The present invention will now be described with reference to the drawings, wherein like reference numerals are provided for like elements throughout.

According to the present invention, a portable electronic device functions to receive and play radio signals (e.g., AM/FM broadcast signals) even in the event the portable electronic device is simultaneously being recharged. The portable electronic device can receive and play the radio signals, regardless of whether the portable electronic device typically utilizes a multifunction connector that cannot simultaneously connect the device to a headset and power adaptor.

Figure 3:
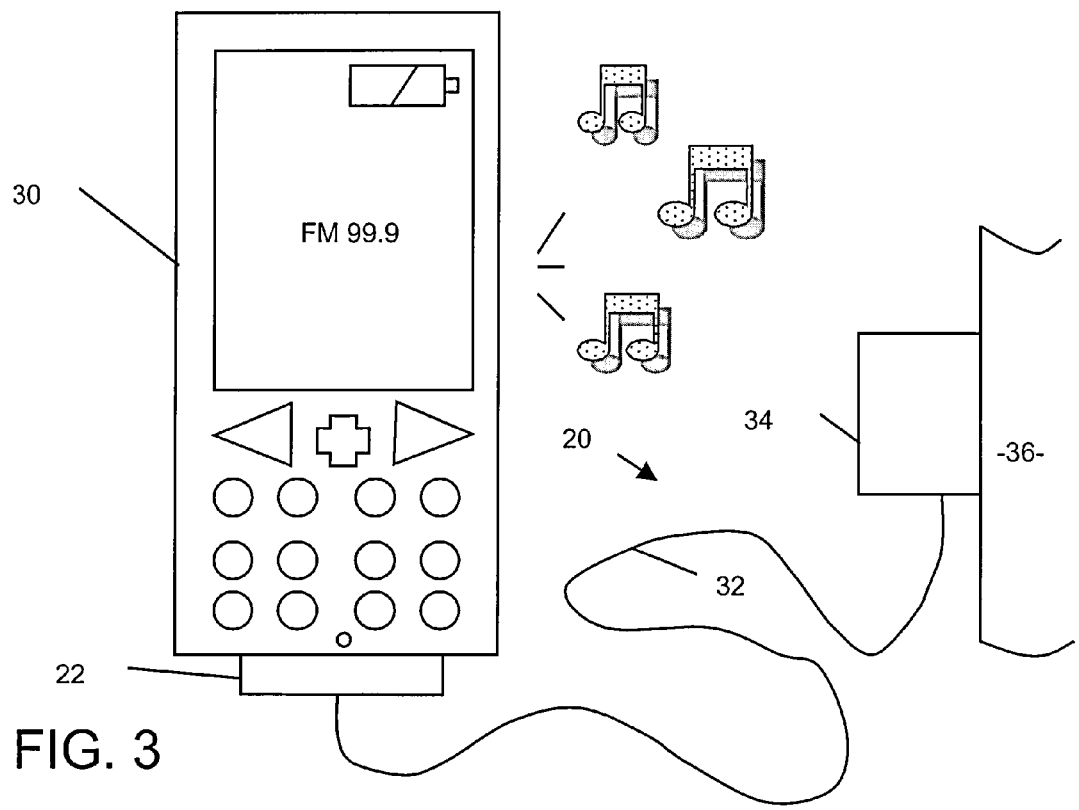
FIG. 3 illustrates a portable electronic device, in the form of a mobile phone, together with a power adaptor in accordance with an embodiment of the present invention.

Referring to FIG. 3, a first embodiment of the present invention is illustrated. The portable electronic device is, for sake of example, a mobile phone 30 that includes a radio frequency (RF) receiver therein (not shown). Unlike the conventional mobile phones discussed above, however, the mobile phone 30 can receive and play AM/FM radio broadcasts even while the battery (not shown) within the mobile phone 30 is being recharged via the power adaptor 20.

More specifically, the present invention utilizes a cable 32 of the power adaptor 20 as an antenna for the radio receiver within the mobile phone 30. As a result, the mobile phone 30 need not rely exclusively on the cable of the headset 16 as an antenna in order to receive radio signals.

The power adaptor 20 includes a plug 34 that plugs into a power supply such as a wall outlet 36, automobile cigarette lighter-type power jack, etc. As is conventional, the power adaptor 20 includes circuitry (not shown) within the plug 34 for converting the power supply voltage (e.g., 120VAC, 12VDC, etc.) to a low-voltage DC battery charge current. The plug 34 provides the battery charge current via the multiconductor cable 32 to the mobile phone 30. (It will be appreciated that throughout the present description multiconductor connections are at times represented by a single line in the drawings for sake of simplicity.)

As noted above, the power adaptor 20 is connected to the mobile phone 30 by way of a connector 22 at the end of the cable 32 being connected to the multifunction connector (not shown) included in the mobile phone 30. The power adaptor 20 provides the battery charge current via the cable 32 to charge up a rechargeable battery included in the mobile phone 30.

The mobile phone 30 includes otherwise conventional sense circuitry (not shown) that senses when the power adaptor 20 has been connected to the mobile phone 30. Upon detecting that the power adaptor 20 has been connected via the multifunction connector, the mobile phone 30 begins to be recharged via internal phone charging circuitry (not shown). At the same time, however, the mobile phone 30 is configured to enable operation of the radio receiver therein using, as explained in more detail below, the cable 32 of the power adaptor 20 as an antenna. The mobile phone 30 is then able to receive radio signals via the cable 32 and reproduce the radio signals via one or more speakers included in the mobile phone 30 and/or an auxiliary headset connector, etc.

Figure 4:
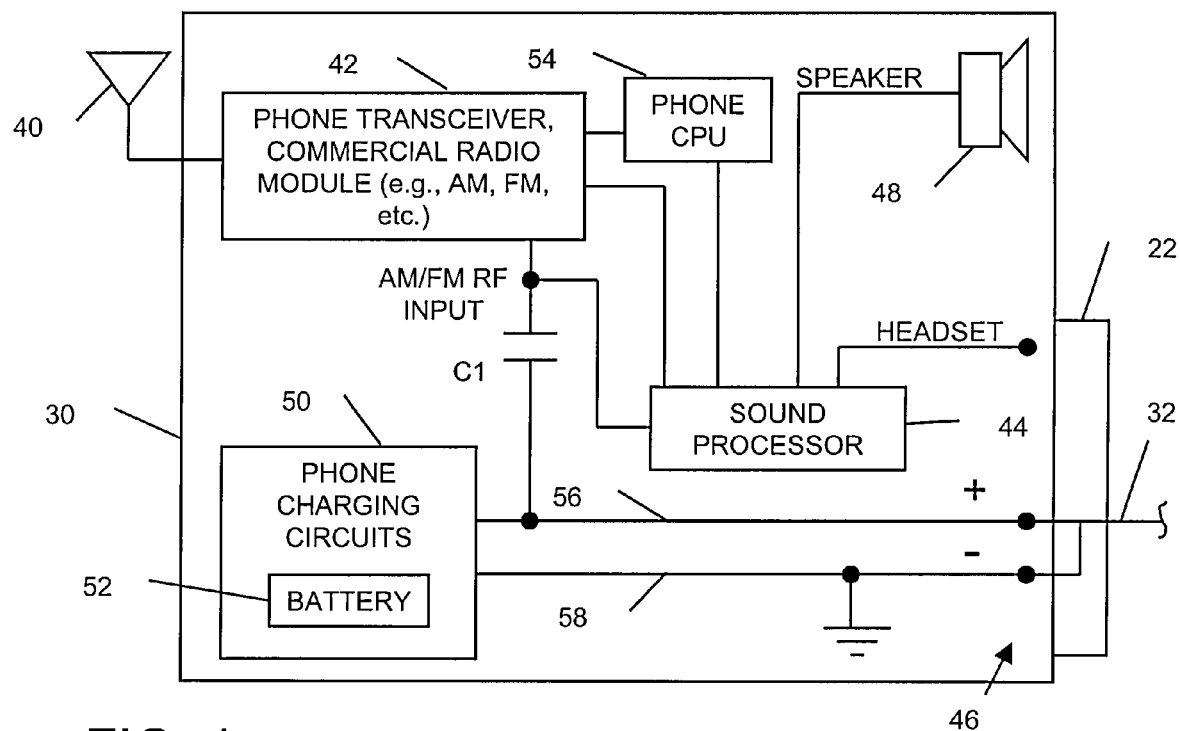
FIG. 4 is a block diagram of the portable electronic device of FIG. 3 in accordance with the present invention.

FIG. 4 illustrates the mobile phone 30 in accordance with the exemplary embodiment of the present invention. The mobile phone 30 includes a conventional mobile phone antenna 40 for receiving mobile phone signals from a communication tower, etc. The output of the antenna 40 is input to a mobile phone transceiver 42 that carries out conventional mobile phone communication operations. The mobile phone transceiver 42 further includes a conventional AM/FM radio transceiver, or "module", which demodulates received AM/FM radio signals. The transceiver 42 outputs the audio signals from the received AM/FM signals to a sound processor 44 included in the mobile phone 30. The sound processor 44 typically normally provides the audio signals to the headset 12 via the multifunction connector 46. In the case where the mobile phone 30 senses that the phone is connected to the power adaptor 20, however, the sound processor 44 outputs the sound to one or more speakers 48 or an auxiliary headset connection (not shown) included in the mobile phone 30.

As far as listening to the radio using the headset 12, the mobile phone 30 is conventional in that normally the headset 12 (FIG. 1) is connected to the headset terminal of the multifunction connector 46 via the corresponding connector 22. The sound processor 44 in turn takes the RF signals received via the headphone cable 16 and inputs the signals to an AM/FM RF input of the transceiver 42. The transceiver 42 outputs the resultant audio signals back to the sound processor 44, and the sound processor 44 in turn outputs the audio signals to the headset 12 via the headset terminal.

The mobile phone 30 also includes conventional phone charging circuits 50 that function to charge a rechargeable battery 52 that provides operating power to the mobile phone 30. In addition, the mobile phone 30 includes a microprocessor 54 configured using conventional techniques to provide overall control of the mobile phone 30 in order to carry out the functions described herein.

Continuing to refer to FIG. 4, the cable 32 provides the battery charge current from the plug 34 to the mobile phone 30 via the connector 22 and multifunction connector 46. The cable 32 includes at least a pair of electrical conductors (e.g., copper wires, etc.) that connect at respective terminals to corresponding positive and negative conductors 56 and 58 of the mobile phone 30. The conductors 56 and 58 are coupled to and provide the battery charge current to the phone charging circuits 50 so that the battery 52 is charged in accordance with conventional techniques.

Additionally, the mobile phone 30 includes decoupling circuitry in the form of a capacitor C1 or the like. The capacitor C1 serves to decouple any AM/FM radio frequency signals induced onto the conductors of the cable 32 and provides the RF signals to an AM/FM RF input of the transceiver 42. The AM/FM receiver within the transceiver 42 in turn demodulates the received signals and delivers the audio signals to the sound processor 44 so that they may be reproduced via the speaker 48. The capacitor C1 is sized so as to provide low impedance coupling of the AM/FM RF signals from the conductor 56 and/or 58 to the RF input of the transceiver 42, while blocking any DC components associated with the battery charge current delivered to the phone charging circuits 50.

Accordingly, the mobile phone 30 is able to receive and reproduce radio signals even when simultaneously being charged using the cable 32 of the power adaptor 20 as an antenna. In a preferred embodiment, the cable 32 is approximately 1500 millimeters (mm) long so as to form a half-wave antenna optimized approximately in the middle of the FM radio frequency band. In addition, the cable 32 may include one or more EMI-filters to improve performance and block low frequency noise as will be appreciated.

The speaker(s) 48 may be the ear speaker used for carrying on a typical telephone conversation using the mobile phone 30. Alternatively, the speaker(s) 48 may include the conference speaker included in some mobile phones for conducting hands-free conference type calls. Still further, the speaker(s) 48 may be speakers included in the mobile phone 30 and dedicated for use in reproducing audio from the radio receiver or other audio media source in the mobile phone 30.

Figure 5:
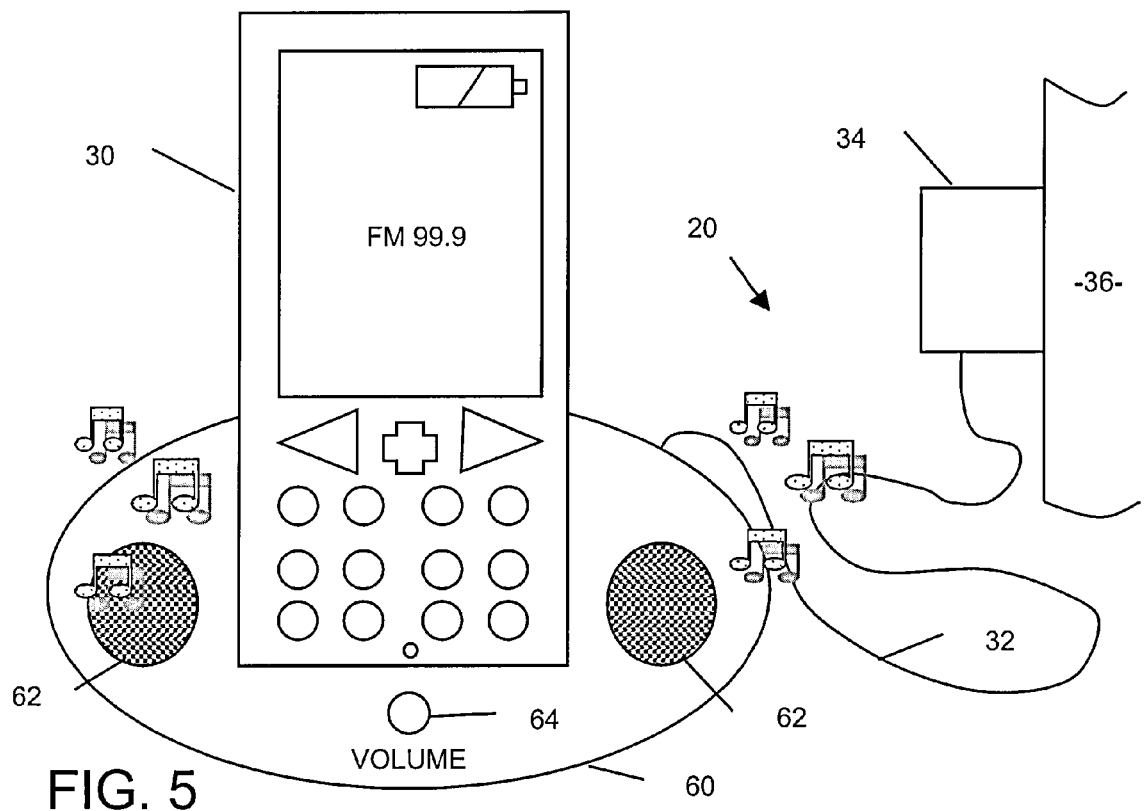
FIG. 5 illustrates a portable electronic device, in the form of a mobile phone, together with a power adaptor with docking station in accordance with another embodiment of the present invention.

FIG. 5 illustrates another embodiment of the invention in which a docking station 60 serves as a base in which the mobile phone 30. The docking station 60 allows the mobile phone 30 to be recharged yet still receive and play radio signals. As is shown in FIG. 5, the docking station 60 replaces the connector 22 in the power adaptor 20. The docking station 60 is designed with it's own internal connector such that when the phone 30 is inserted into the docking station 60, the multifunction connector 46 engages the internal connector of the docking station 60.

Figure 6:
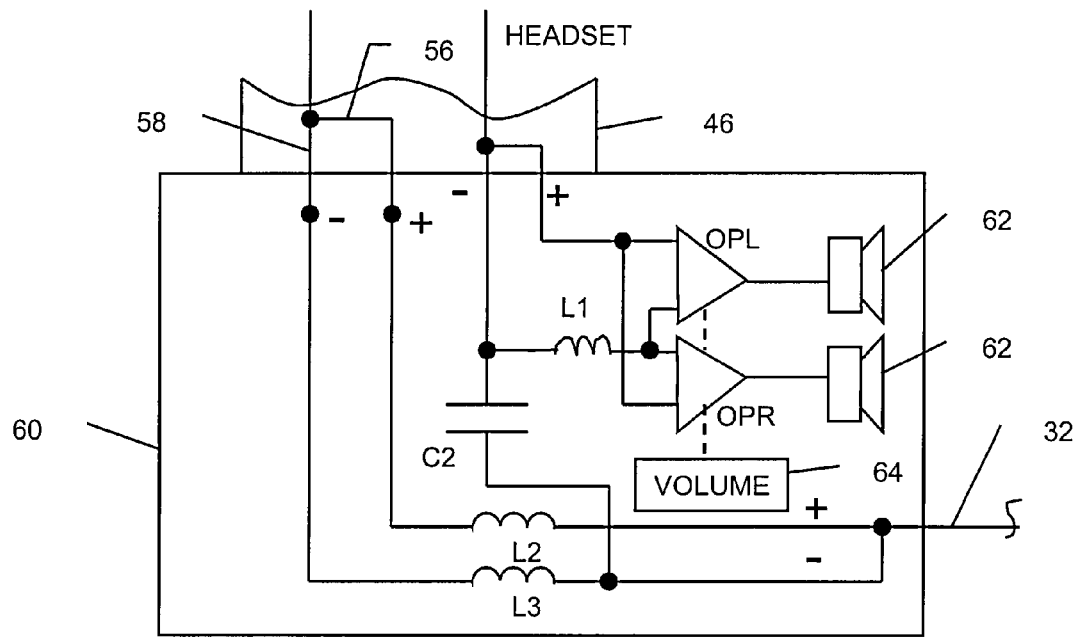
FIG. 6 is a block diagram of the docking station of FIG. 5 according to a particular embodiment of the present invention.

Referring to FIG. 6 specifically, the docking station 60 receives the battery charge current via the positive and negative electrical conductors in the cable 32. The docking station 60 couples the electrical conductors to the positive and negative conductors 56 and 58 of the phone 30, respectively, via the internal connector of the docking station 60 and the multifunction connector 46 of the mobile phone 30. The docking station 60 thereby provides the battery charge current to the phone charging circuits 50 in the manner described above in connection with the embodiment of FIG. 4.

Figure 2:
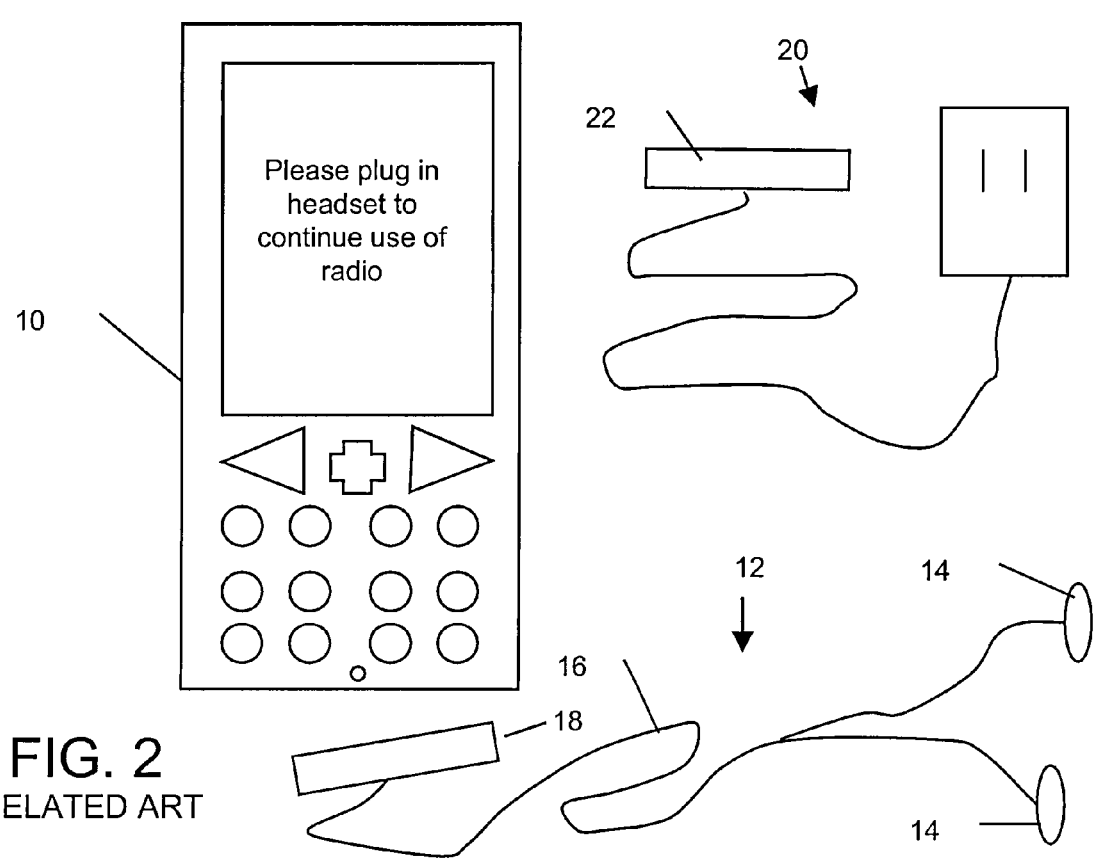
FIG. 2 illustrates the conventional portable electronic device of FIG. 1 together with the headset and a power adaptor for recharging a battery included in the portable electronic device.

In the present embodiment, however, the mobile phone 30 does not necessarily include decoupling circuitry such as the capacitor C1 in FIG. 4. Rather, the docking station 60 itself includes decoupling circuitry such as a capacitor C2 that, similar to the capacitor C1 in the embodiment of FIG. 4, decouples any RF signals induced on the cable 32. More particularly, the capacitor C2 is coupled at one end to the positive and/or negative conductor from the cable 32. The other end of the capacitor C2 is coupled via the internal connector to the headset terminal in the mobile phone 30 that otherwise would serve as the antenna input in the case where the cable 16 of the headset 12 serves as the antenna for mobile phone 30. The RF signals decoupled from the cable 32 are therefore provided to the AM/FM RF input of the receiver circuit in the transceiver 42 in the same manner as they would be provided from the headset 12. This eliminates the need for modifying a conventional mobile phone as in FIGS. 1 and 2 to include decoupling circuitry.

As in the previous embodiment, the capacitor C2 is sized so as to represent a relatively low impedance to signals in the RF band, yet block any DC component associated with the battery charge current also provided via the cable 32. Again, EMI filters may be included at the end(s) of the cable 32 or elsewhere to provide filtering as will be appreciated.

As further represented in FIG. 6, the mobile phone 30 provides the left and right channel audio signals back to the docking station 60 via the headset terminals in the respective internal connector and multifunction connector 46. The radio receiver within the transceiver 42 demodulates the RF signals input via the capacitor C2 and provides the left and right channel audio signals. These left and right audio signals are input to respective differential audio amplifiers OPL and OPR included in the docking station 60. In this particular embodiment, the capacitor C2 is coupled to the negative conductor or the cable 32 and provides a common reference to the amplifiers OPL and OPR through an RF choke inductor L1. The amplifiers OPL and OPR amplify the respective audio signals and reproduce them through speakers 62 also included in the docking station 60. The gain of the amplifiers OPL and OPR may be controlled using a volume control 64 as will be further appreciated.

The inductor L1 specifically serves to block the RF signal decoupled by the capacitor C2 from being decoupled to the system ground at AM/FM frequencies (e.g., via the amplifiers OPL and OPR). In addition, inductors L2 and L3 are provided in the positive and negative conductors 56 and 58, respectively, as shown in FIG. 6. Inductors L2 and L3 serve to block the RF signals induced on the cable 32 from being decoupled to the system ground at AM/FM frequencies (it will be appreciated that the inputs to the phone charging circuits 50 (FIG. 4) are equal to ground at AM/FM frequencies). In addition, the inductors L2 and L3 protect against noise originating from the docking station 60 and/or mobile phone 30 from being coupled to the RF receiver input of the mobile phone 30. Thus, the present invention allows for AM/FM signals induced on the cable 32 to be input to the RF receiver input of the mobile phone 30 while maintaining a high input impedance at the input of the RF receiver, as is desirable. Although not specifically shown, the inductors L1-L3 may similarly be included in the embodiment of FIG. 4 for similar purposes.

The docking station 60 therefore can serve both to recharge a portable electronic device such as the mobile phone 30, and simultaneously provide an antenna to the radio receiver within the mobile phone 30. Still further, the docking station 60 eliminates the need for providing decoupling circuitry in the mobile phone 30 itself. Moreover, the docking station 60 may be used as an external audio amplifier and speaker system separate and apart from the mobile phone 30. As a result, the playing of the radio can draw power mostly from the docking station 60. This reduces the power draw from the battery 52 within the mobile phone 30. In addition, the use of external amplifiers OPL/OPR and speakers 62 can provide improved listening fidelity as will be appreciated.

Figure 7:
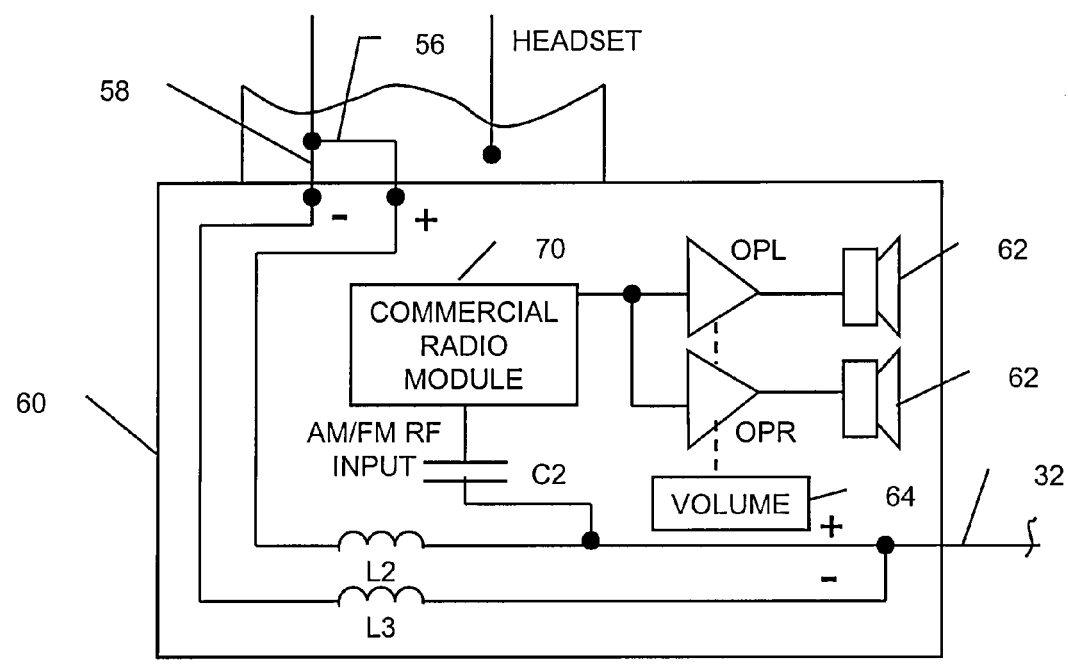
FIG. 7 is a block diagram of the docking station of FIG. 5 according to another particular embodiment of the present invention.

Briefly referring to FIG. 7, another embodiment of the docking station 60 is shown. In this embodiment, the mobile phone 30 need not even include an RF receiver in the transceiver 42. Rather, the docking station 60 in this embodiment includes its own radio receiver 70. The capacitor C2 decouples the RF signals induced onto the cable 32 and inputs the signals into the AM/FM RF input of the radio receiver 70. Audio signals derived from the RF signals are then output from the radio receiver 70 to the respective left and right channel amplifiers OPL and OPR. Thus, in addition to providing a means for recharging the mobile phone 30 the docking station 60 also provides radio reception to mobile phones 30 that do not otherwise include a radio receiver.

It will be appreciated that in another embodiment of the invention, the docking station 60 does not need to include its own speakers 62. The docking station 60 may instead include its own headset jack for receiving a headset. Alternatively, the docking station 60 and/or mobile phone 30 may be configured to reproduce the audio signals using the speaker(s) 48 included in the mobile phone 30 itself.

The present invention has been described primarily in the context of a portable electronic device that is a mobile phone 30. However, the present invention is not limited to such type of portable electronic device in the broadest sense of the invention. The portable electronic device can be any type of device without departing from the scope of the invention.

The present invention has also been described primarily in the context of a docking station serving as an accessory for both charging the portable electronic device and providing an antenna via its cable. It will be appreciated, though, that other types of accessories are also contemplated as being within the scope of the invention.

The term "electronic device" as referred to herein includes a portable radio communication device. The term "portable radio communication device", also referred to herein as a "mobile radio terminal", includes all device such as mobile phones, pagers, communicators, e.g., electronic organizers, personal digital assistants (PDAs), smartphones or the like. In the present application, the invention is described primarily in the context of a mobile phone. However, it will be appreciated that the invention is not intended to be limited to a mobile phone and can be any type of portable electronic device.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A method of providing battery charge current to a portable electronic device having a rechargeable battery, the method comprising the steps of:
   providing a power adaptor which connects to a power supply and converts power from the power supply into a battery charge current;
   providing a cable operative to deliver the battery charge current from the power adaptor to the portable electronic device to charge the rechargeable battery, the cable comprising at least one pair of electrical conductors for delivering the battery charge current; and
   providing radio frequency (RF) signals induced onto the at least one pair of electrical conductors of the cable to an RF receiver input, the RF receiver input being configured to receive the RF signals induced onto the at least one pair of electrical conductors, wherein the cable serves as an antenna while simultaneously the at least one pair of electrical conductors delivers the battery charge current.

2. The method of claim 1, wherein the cable connects to the portable electronic device, and the portable electronic device comprises decoupling circuitry operative to decouple the RF signals from the cable and to provide the RF signals to the RF receiver input, the RF receiver input being included in the portable electronic device.

3. The method of claim 2, wherein the decoupling circuitry comprises a decoupling capacitor.

4. The method of claim 2, wherein the decoupling circuitry blocks DC components on the cable from being input to the RF receiver input.

5. The method of claim 1, wherein an accessory is coupled to the cable and provides the battery charge current to the portable electronic device, the accessory comprising decoupling circuitry operative to decouple the RF signals from the cable and to provide the RF signals to the RF receiver input.

6. The method of claim 5, wherein the RF receiver input is included in the portable electronic device.

7. The method of claim 6, wherein the accessory is a docking station for use when charging the rechargeable battery in the portable electronic device.

8. The method of claim 5, wherein the RF receiver input is included in the accessory.

9. The method of claim 8, wherein the accessory further includes an audio amplifier for amplifying audio signals output from the RF receiver included within the accessory.

10. The method of claim 9, wherein the accessory further includes at least one speaker for reproducing the audio signals.

11. The method of claim 1, wherein the cable is coupled to at least one inductor for isolating the cable from system ground at frequencies of the RF signals.

12. A portable electronic device, comprising:
a rechargeable battery;
an input for receiving a battery charge current from a cable operative to deliver the battery charge current from a power adaptor to the portable electronic device in order to charge the rechargeable battery, the cable comprising at least one pair of electrical conductors for delivering the battery charge current;
a radio receiver including an RF receiver input, the RF receiver input being configured to receive RF signals induced onto the at least one pair of electrical conductors of the cable, wherein the cable serves as an antenna while simultaneously the at least one pair of electrical conductors delivers the battery charge current; and
decoupling circuitry operative to decouple RF signals induced onto the cable and to provide the RF signals to the RF receiver input.

13. The device of claim 12, wherein the decoupling circuitry comprises a decoupling capacitor.

14. The device of claim 12, wherein the decoupling circuitry blocks DC components on the cable from being input to the RF receiver input.

15. A docking station for docking a portable electronic device having a rechargeable battery in order to recharge the rechargeable battery, the docking station comprising:
an input for receiving a battery charge current from a cable operative to deliver the battery charge current from a power adaptor to the portable electronic device via the docking station in order to charge the rechargeable battery; and
decoupling circuitry operative to decouple RF signals induced onto the cable and to provide the RF signals to an RF receiver input, wherein the cable serves as an antenna and simultaneously delivers the battery charge current.

16. The docking station of claim 15, wherein the RF receiver input is included in the portable electronic device.

17. The docking station of claim 16, wherein the docking station includes an audio amplifier for amplifying audio signals output from the RF receiver included within the portable electronic device.

18. The docking station of claim 17, wherein the docking station further includes at least one speaker for reproducing the audio signals.

19. The docking station of claim 15, wherein the RF receiver input is included in the docking station.

20. The docking station of claim 19, wherein the docking station further includes an audio amplifier for amplifying audio signals output from the RF receiver included within the docking station.

21. The docking station of claim 20, wherein the docking station further includes at least one speaker for reproducing the audio signals.

22. The docking station of claim 15, wherein the cable is coupled to at least one inductor for isolating the cable from system ground at frequencies of the RF signals.

* * * * *